(12) United States Patent
Shin

(10) Patent No.: US 7,290,498 B2
(45) Date of Patent: Nov. 6, 2007

(54) VENT PLUG FOR MILKING LINER

(75) Inventor: Jin-Woong Shin, Copley, OH (US)

(73) Assignee: Lauren AgriSystems, Ltd., New Philadelphia, OH (US)

( * ) Notice: Subject to any disclaimer, the term of this patent is extended or adjusted under 35 U.S.C. 154(b) by 294 days.

(21) Appl. No.: 11/121,478

(22) Filed: May 3, 2005

(65) Prior Publication Data

US 2005/0284379 A1 Dec. 29, 2005

Related U.S. Application Data

(63) Continuation-in-part of application No. 10/987,696, filed on Nov. 12, 2004.

(60) Provisional application No. 60/583,705, filed on Jun. 29, 2004.

(51) Int. Cl.
*A01J 5/04* (2006.01)

(52) U.S. Cl. ................................................. 119/14.47

(58) Field of Classification Search ............ 119/14.47, 119/14.48, 14.49, 14.5, 14.51, 14.52, 14.53
See application file for complete search history.

(56) References Cited

U.S. PATENT DOCUMENTS

| 488,282 A | 12/1892 | Mehring |
|---|---|---|
| 3,255,732 A | 6/1966 | Raht |
| 3,476,085 A | 11/1969 | Noorlander |
| 3,482,547 A * | 12/1969 | Maier ...................... 119/14.36 |
| 3,659,558 A | 5/1972 | Noorlander |
| 3,931,795 A | 1/1976 | Duncan |
| 3,967,586 A | 7/1976 | Noorlander |
| 3,967,587 A | 7/1976 | Noorlander |
| 4,263,875 A | 4/1981 | Maier |
| 4,303,038 A | 12/1981 | Thompson |
| 4,441,454 A | 4/1984 | Happel |
| 4,604,969 A | 8/1986 | Larson |
| 5,161,482 A | 11/1992 | Griffin |
| 6,055,931 A | 5/2000 | Sanford |
| 6,308,655 B1 | 10/2001 | Oosterling |
| 6,631,694 B1 | 10/2003 | Chowdhury |
| 6,745,718 B1 | 6/2004 | Chowdhury |
| 6,755,153 B1 | 6/2004 | Chowdhury |
| 6,776,120 B1 | 8/2004 | Chowdhury |
| 6,796,272 B1 | 9/2004 | Chowdhury |

FOREIGN PATENT DOCUMENTS

| EP | 1334656 A | 8/2003 |
|---|---|---|
| FR | 1525716 A | 5/1968 |

* cited by examiner

*Primary Examiner*—Rob Swiatek
(74) *Attorney, Agent, or Firm*—Zollinger & Burleson, Ltd

(57) ABSTRACT

A vent plug for a milking liner has a shielded inlet that reduces the likelihood that it will become clogged with debris from the floor of the milking parlor. In one embodiment, the vent plug has a plurality of redundant inlets that allow the vent plug to function if one of the inlets becomes clogged. In another embodiment, the inner flange of the body of the vent plug is at least twice the thickness of the body tube to help secure the vent plug in the milking liner.

16 Claims, 10 Drawing Sheets

VENT PLUG FOR MILKING LINER

CROSS REFERENCE TO RELATED APPLICATIONS

This application is a continuation-in-part application claiming priority from U.S. patent application Ser. No. 10/987,696 filed Nov. 12, 2004; which claims priority from U.S. Provisional Patent Application Ser. No. 60/583,705 filed Jun. 29, 2004; the disclosures of both are incorporated herein by reference.

BACKGROUND OF THE INVENTION

1. Technical Field

This invention generally relates to milking apparatus that use milking liners to draw milk from the teat. More particularly, the invention is related to the vent used with the milking liner. Specifically, the invention relates to anti-clogging vent plugs that may be selectively installed into and removed from milking liners.

2. Background Information

Automatic milking machines have been used to extract milk from different mammals through most of the past century. Most of these machines include a claw that typically has four nipples that are connected to teat cup assemblies that are attached to the teats. The teat cup assemblies include a rigid (hard plastic or metal) shell with a resilient, elastomeric milking liner (also known as a milking inflation) disposed within the shell. A short milk tube extends from the liner. A vacuum source is applied to the short milk tube and an alternating vacuum is applied to the shell to cause the liners to collapse and expand and thereby massage the teats and suck milk from the teats. The milk flows from the liners, into the short milk tube, to the nipples of the claw, and from there through a conduit to a collection tank.

The liner is one of the few components of an automatic milking machine that comes into direct contact with the cow. Liners collapse and expand to massage the teat to cause milk to flow. Liner performance may be maximized with the proper pulsation ratio. Numerous milking inflation designs have been developed for collapsing on the teat in different manners. The art desires an inflation having an open, relatively large, readily collapsible barrel that uniformly collapses around the teat to provide effective and comfortable milking. The structure of the barrel should provide a reliable collapsing configuration and a long useful life. Liners that collapse and expand slowly are undesirable. Liners that pinch or otherwise irritate the teat are also undesirable.

Air vents are also used with liners. The air vents are used to prevent the milk in the barrel or short milk tube of the liner from being drawn back towards the teat when the liner expands. An exemplary vent plug is shown in U.S. Pat. No. 6,055,931. A draw back with these types of vent plugs is that the air inlet opening is exposed to the environment under a cow and is frequently clogged by splattering debris (such as manure) from the floor in the milking parlor. Although the clog resistant air vent plug shown in U.S. Pat. No. 6,055,931 is effective, the art desires additional air vent plug designs that do not clog.

SUMMARY OF THE INVENTION

In one configuration, the invention provides a vent plug for a milking liner wherein the inlet of the vent plug is shielded to reduce the likelihood that it will become clogged with debris from the floor of the milking parlor.

Another aspect of one configuration of the invention is that the vent plug provides a plurality of redundant inlets that allow the vent plug to function if one of the inlets becomes clogged.

Another configuration of the invention provides a vent plug having a spacer that is positioned at the outer flange between the inlet and the sidewall of the short milk tube.

In a further embodiment, the invention provides an outer flange for a vent plug wherein the outer flange includes a cap that is snap into the outer flange.

BRIEF DESCRIPTION OF THE DRAWINGS

Similar numbers refer to similar parts throughout the specification.

DETAILED DESCRIPTION OF THE INVENTION

Figure 1:
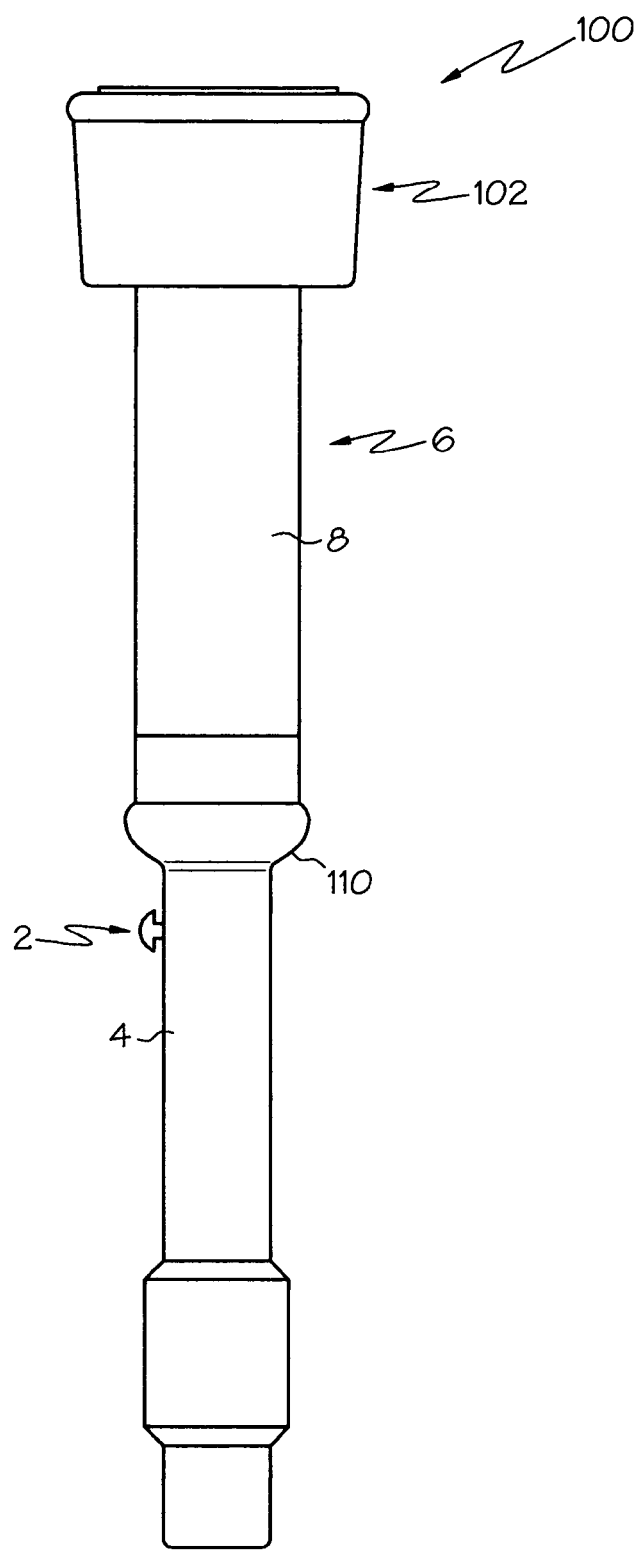
FIG. 1 is an elevation view of a milking liner using the vent plug of the present invention.

The vent plug of the invention is indicated generally by the numeral 2 in the accompanying drawings. Vent plug 2 allows air to be drawn into a short milk tube 4 of a milking liner 6 when a barrel 8 of liner 6 is moving from the collapsed configuration toward the uncollapsed configuration to prevent milk from being drawn back towards barrel 8. In the context of this application, the term "milking liner" or "liner" includes short milk tube 4 regardless of whether short milk tube 4 is integrally formed with barrel 8.

Figure 2:
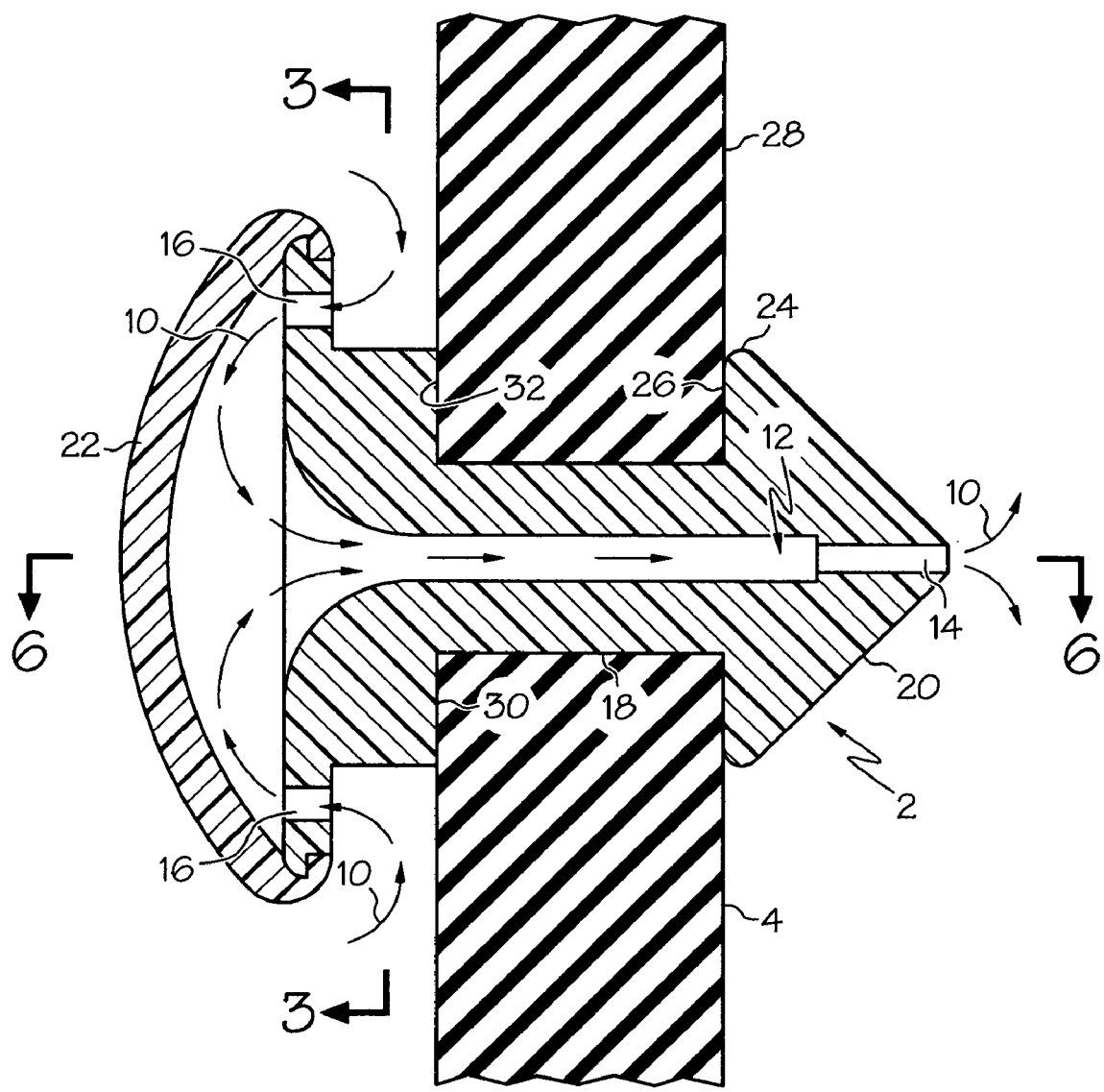
FIG. 2 is a section view of the vent plug of FIG. 1.
Figure 8:
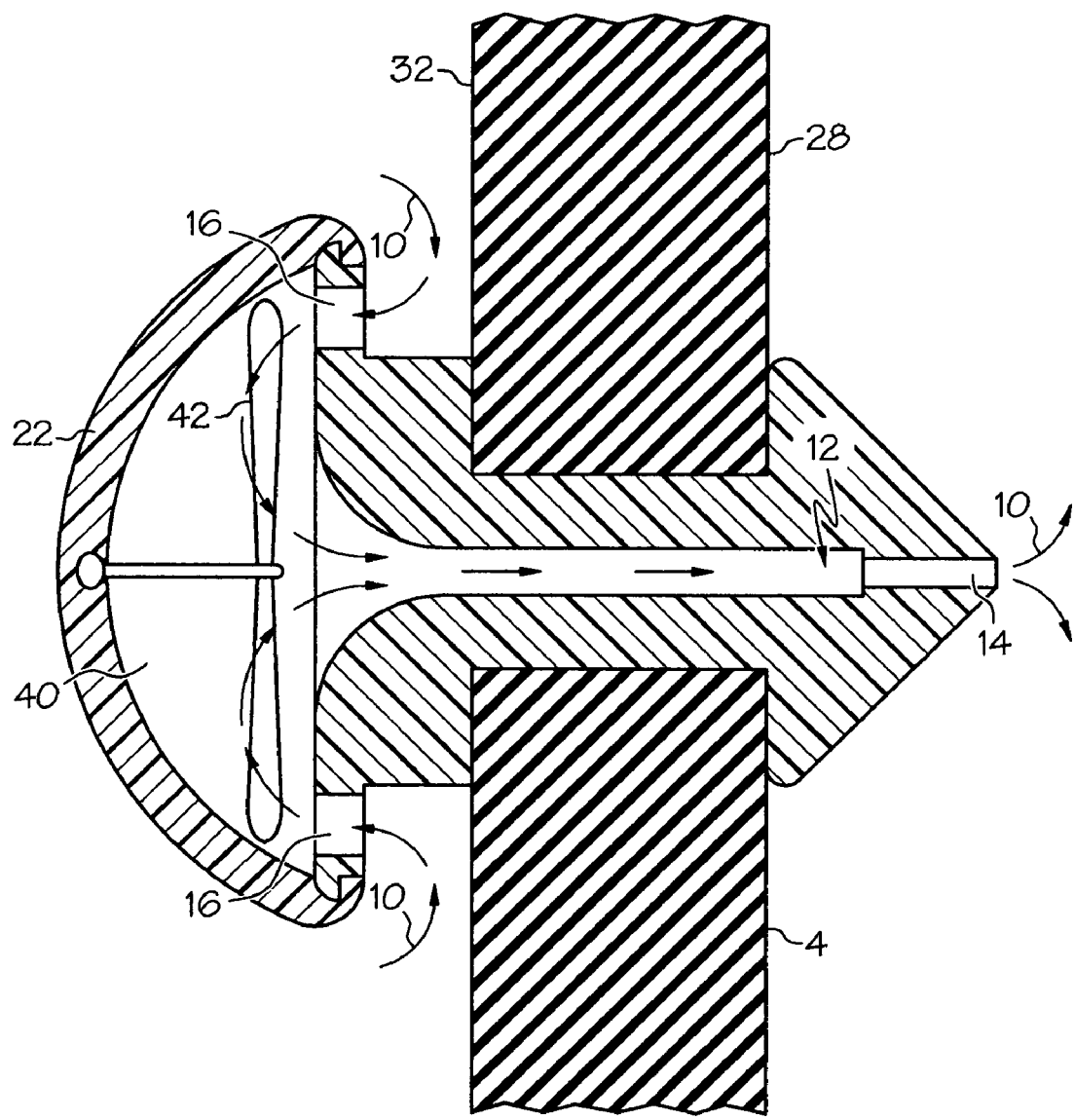
FIG. 8 is a view similar to FIG. 2 showing an alternative embodiment of the vent plug.
Figure 9:
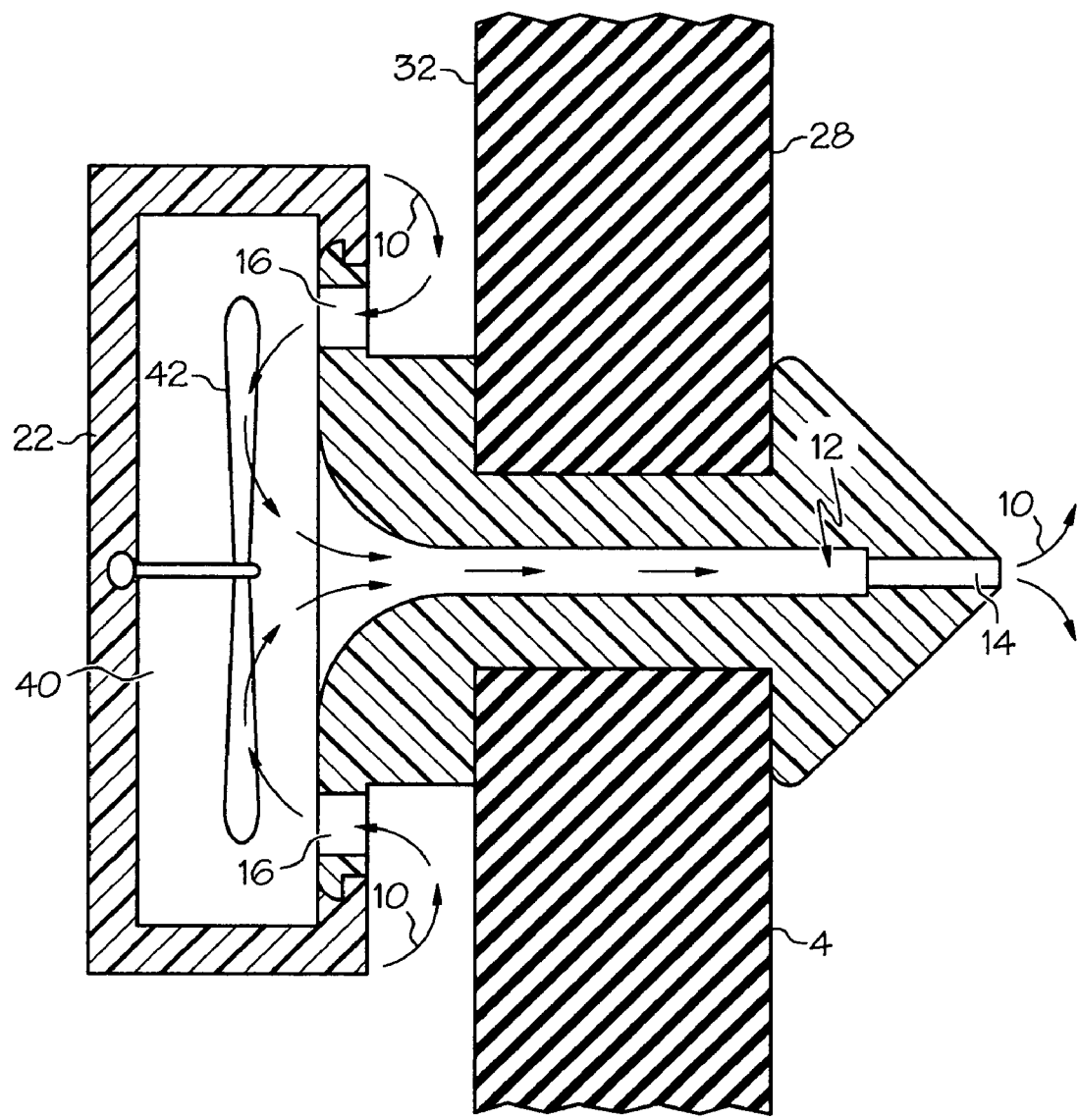
FIG. 9 is a view similar to FIG. 8 showing a further alternative embodiment of the vent plug.

The air being drawn into short milk tube 4 through vent plug 2 is indicated by the numeral 10 in FIGS. 2, 8, and 9. Vent plug 2 defines a vent passage 12 that extends entirely through vent plug 2 such that the passageway defined by short milk tube 4 is in fluid communication with the atmosphere surrounding the outer surface of short milk tube 4. Vent passage 12 includes an outlet 14 adapted to be disposed inside liner 6 and at least one inlet 16 adapted to be positioned outside liner 6. Inlet 16 faces the outer surface of liner 6 such that inlet 16 is protected from debris that may be splashed or splattered against the outer surface of vent plug 2. This inlet 16 configuration requires air 10 to turn through a 180 degree curve before passing through vent plug 2. Inlet 16 is thus disposed between at least a portion of the body of vent plug 2 and a portion of short milk tube 4 or between a portion of the body and outlet 14.

Figure 3:
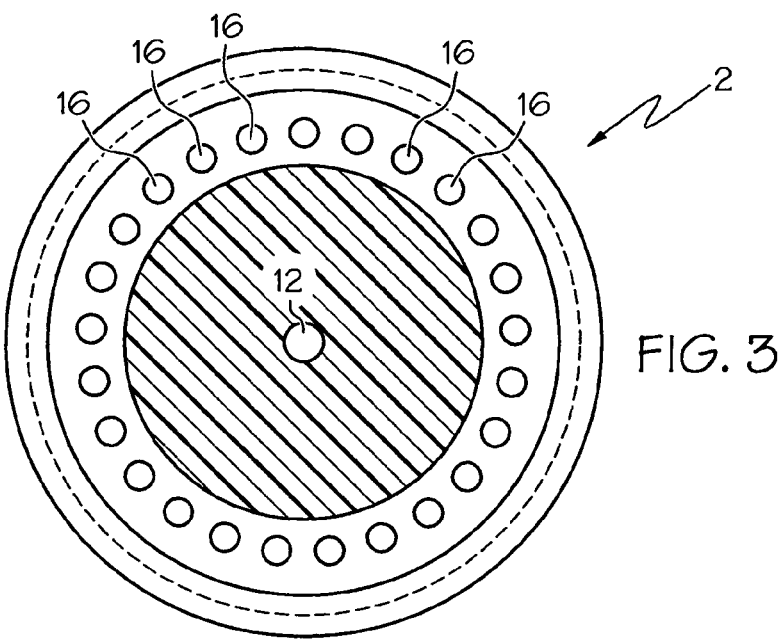
FIG. 3 is a section view taken along 3-3 of FIG. 2 showing one embodiment for the inlets.
Figure 4:
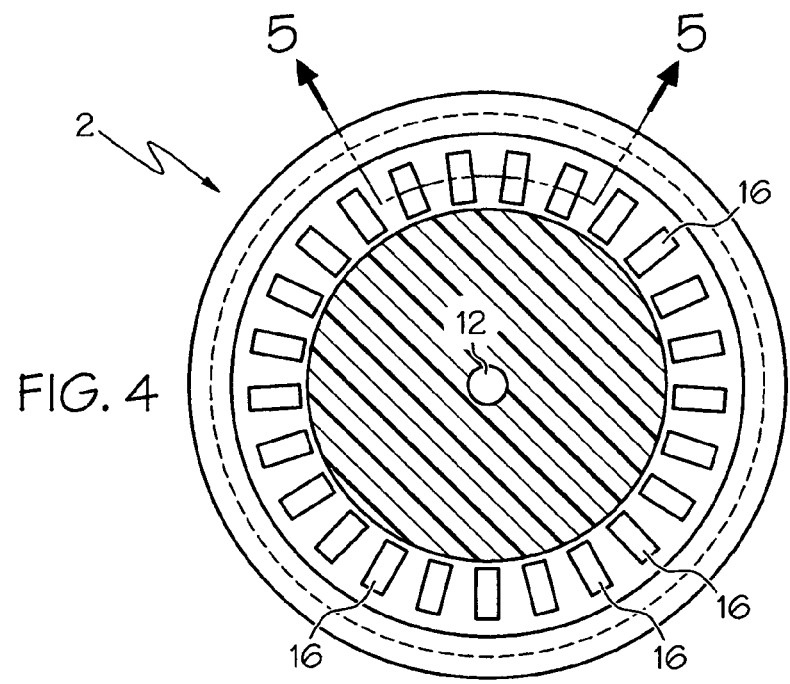
FIG. 4 is a view similar to FIG. 3 showing an alternative embodiment for the inlets.
Figure 5:
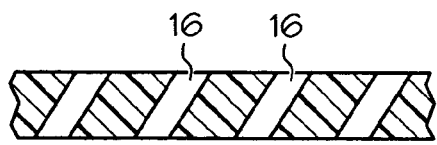
FIG. 5 is a section view showing another alternative embodiment for the inlets.

In the exemplary embodiments of the invention, inlet 16 may be provided in the form of a plurality of inlet holes 16 as shown in FIGS. 3 and 4. The use of more than one inlet hole 16 also makes vent plug 2 less likely to clog. Various inlet configurations are contemplated by the inventors including a single inlet 16 sized the same, smaller than, or larger than outlet 14 or a plurality of inlets 16. Inlet holes 16 may be formed straight through (each having a longitudinal axis normal to the surface) the inwardly-facing body wall of vent plug 2 or may be tilted at an acute angle (such as having longitudinal axis disposed 15 to 75 degrees to the surface) as shown in FIG. 5 to create a swirling air pattern within vent passage 12. The configuration of inlet 16, the use of multiple inlets 16, and the location of inlets 16 between the body of vent plug 2 and the wall of short milk tube 4 makes vent plug 2 difficult to clog.

Figure 6:
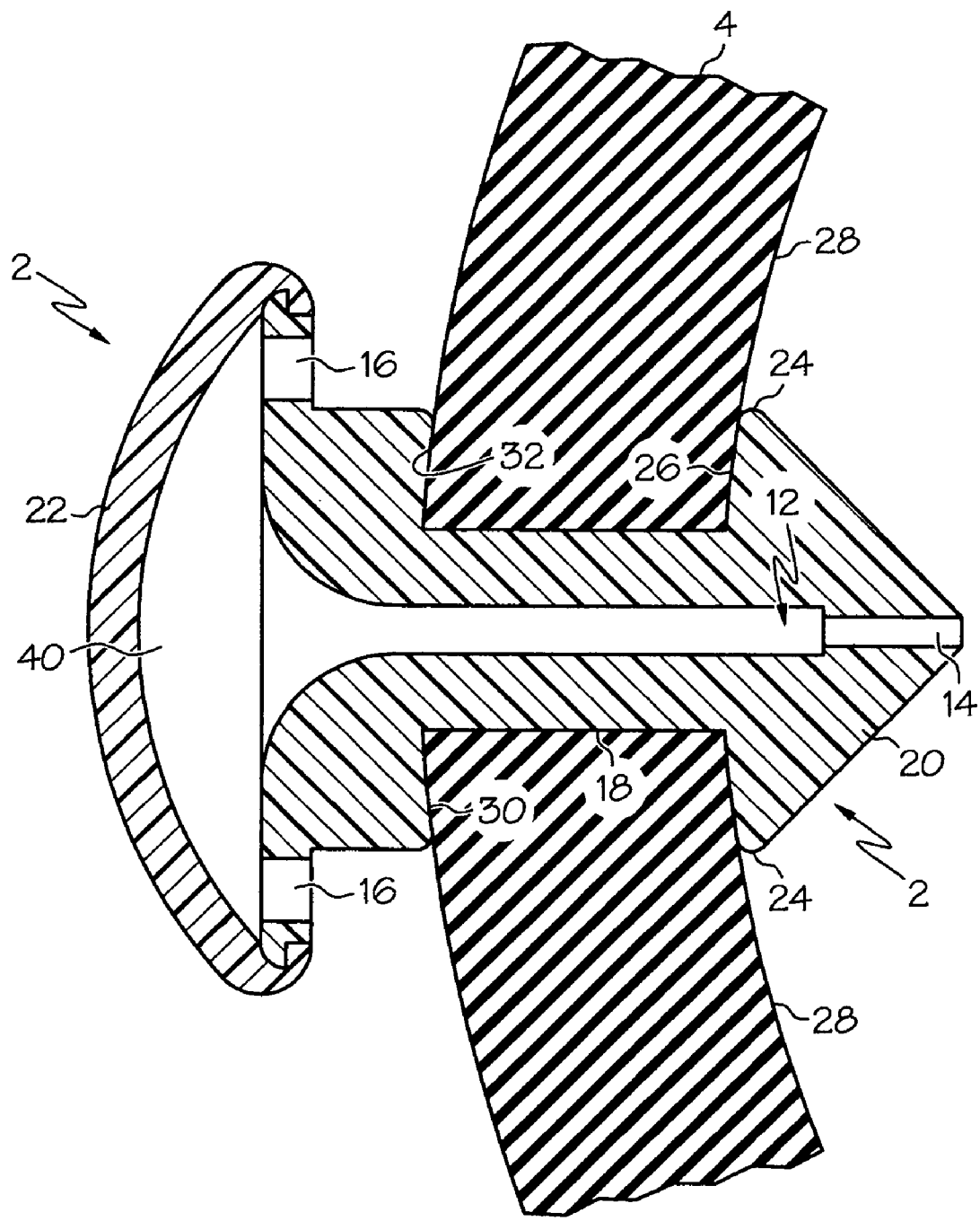
FIG. 6 is a section view taken along line 6-6 of FIG. 2.

The body of vent plug 2 generally includes a body tube 18, an inner flange 20, and an outer flange 22. Inner flange 20 is pointed or in the form of a cone or a pyramid so that it may be forced through the opening defined by short milk tube 4 in order to install vent plug 2. The outer corner 24 of flange 20 may be rounded to help flange 20 fit through the opening of short milk tube 4 so that it does not tear the material of short milk tube 4. As shown in FIG. 6, the outwardly facing surface 26 of inner flange 20 is optionally formed with the same curvature as the inner surface 28 so that a tight seal is formed between flange 20 and short milk tube 4. Similarly, the inwardly facing surface 30 of outer flange 22 has a curvature substantially similar to the curvature of the outer surface 32 of short milk tube 4 so that a tight seal is formed between vent plug 2 and milk plug 4.

Figure 7:
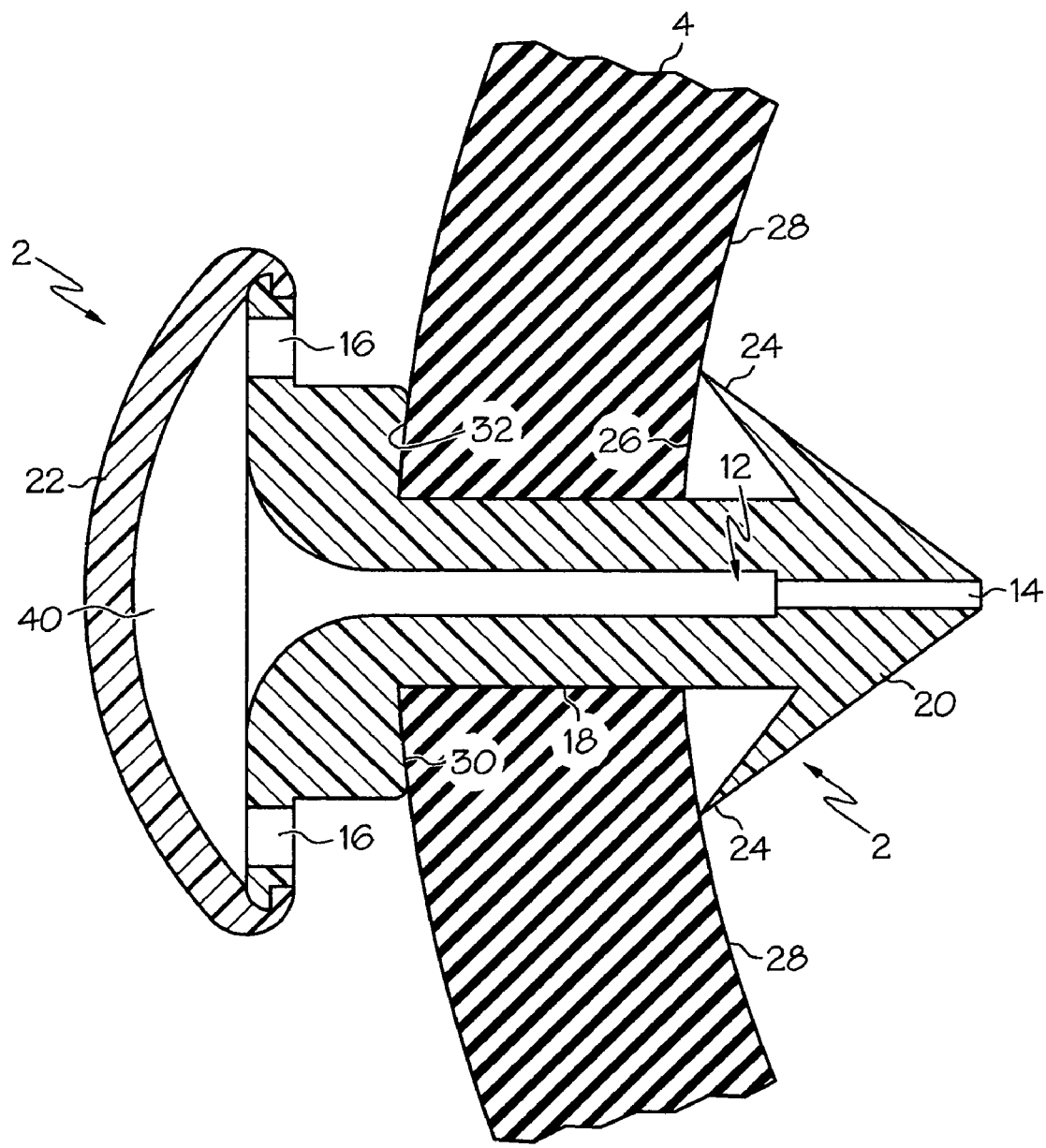
FIG. 7 is a view similar to FIG. 6 showing an alternative flange configuration.

An alternative embodiment of vent plug 2 is depicted in FIG. 7 wherein flange 20 is hook shaped with outer corner 24 being sharply pointed. The sharp outer corner engages inner surface 28 to help prevent vent plug 2 from being unintentionally pulled out of place.

In the exemplary embodiment, outer flange 22 includes two stepped portions. The first stepped portion engages the outer body wall of short milk tube 4. The first stepped portion has a sidewall that defines the distance the second stepped portion is spaced from the outer surface of short milk tube 4. The second stepped portion is spaced from the outer surface of the body wall of short milk tube 4 and provides an overhang that defines and shields inlet 16. Each inlet 16 may be spaced from the sidewall of the first stepped portion as shown in FIGS. 2 and 3. The spacing helps prevent fluid and/or debris flowing down the outer surface of short milk tube 4 from resting on the sidewall of the first stepped portion and directly entering inlet 16.

In the exemplary embodiment, the inner surface of the overhang that defines inlet 16 is disposed 90 degrees with respect to the longitudinal axis of vent plug 2. Inlet 16 thus faces liner 16 or faces toward inner flange 20. In other embodiments, the inner surface of the overhang forms an acute or obtuse angle with the longitudinal axis of vent plug 2 causing inlet 16 to face inwardly at an angle.

In an alternative embodiment of the invention, the first stepped portion defines inlet 16 through its sidewall. When inlet 16 is normal to the sidewall surface, air 10 must turn through a 90 degree curve before passing through vent plug 2. In this alternative embodiment, the second stepped portion may shield inlet 16. In another embodiment, the second stepped portion may be eliminated with only the corner between the outer surface of the stepped portion and the sidewall of the stepped portion protecting and shielding inlet 16. Further, vent passage 12 may be acutely or obtusely angled (with respect to the longitudinal axis of vent plug 2) through the first stepped portion with inlet 16 exiting the sidewall at an angle facing liner 6 or facing away from liner 6.

Outer flange 22 may define a common vent chamber 40 when inlet 16 is in the form of multiple openings. Vent chamber 40 allows all the air 10 to mix from each inlet 16 and allows any debris that enters a single inlet hole 16 to fall to the bottom of vent plug 2 before being sucked through vent passage 12 into short milk tube 4. In the exemplary embodiment, outer flange 22 includes a cap that is snap fit to the body of vent plug 2. In other embodiments, outer flange 22 may be integrally formed. When the cap of outer flange 22 is removable, vent passage 12 may be cleaned by removing the cap and then cleaning passage 12.

Alternative embodiments of vent plug 2 are depicted in FIGS. 8 and 9. In these alternative embodiments, an impeller 42 is rotatably disposed within common vent chamber 40. Impeller 42 freely rotates and is spun by air 10 being pulled through vent plug 2. Impeller 42 can be used to keep chamber 40 clear of debris.

Figure 10:
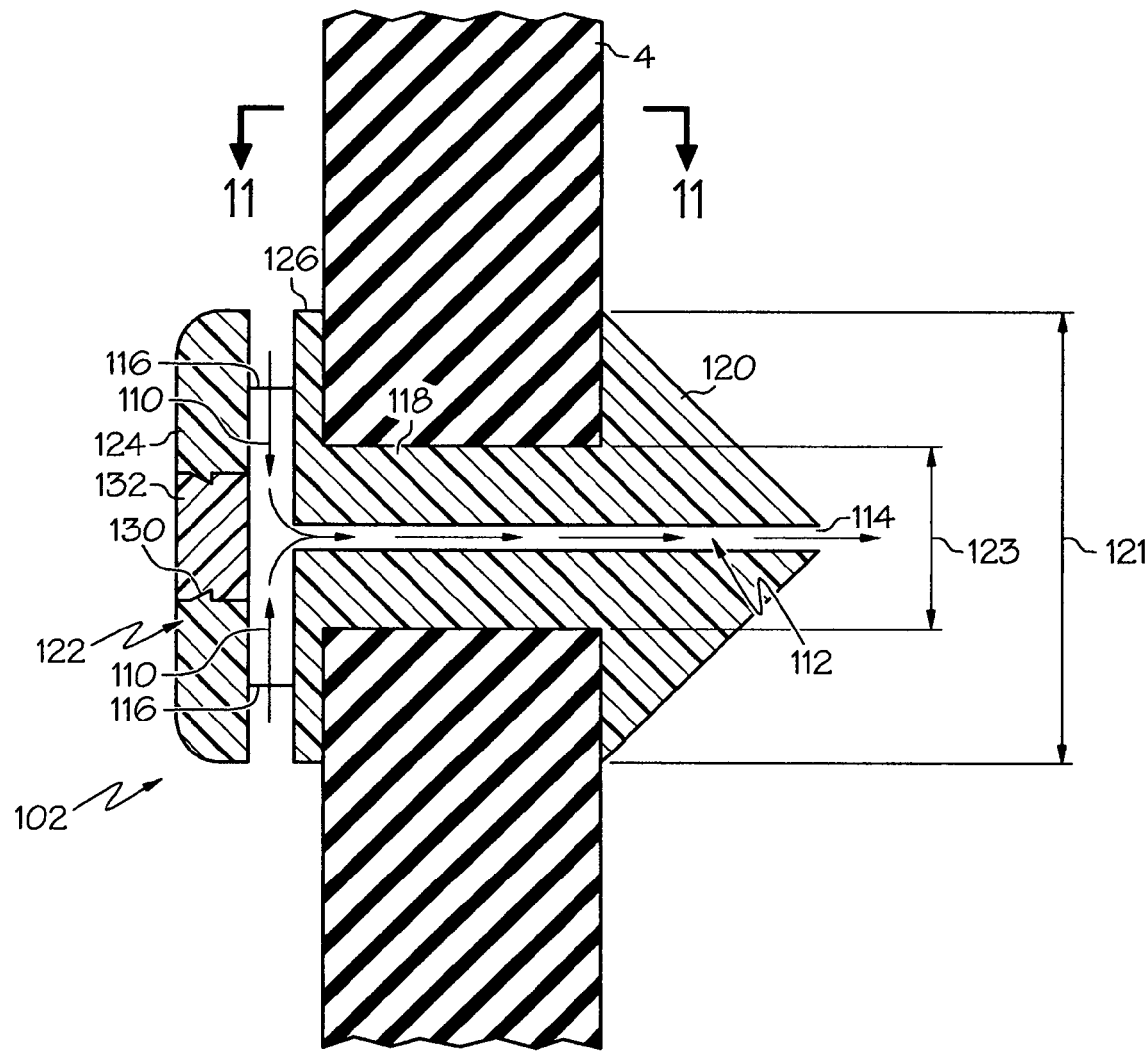
FIG. 10 is a view similar to FIG. 2 showing an alternative embodiment of the vent plug.
Figure 11:
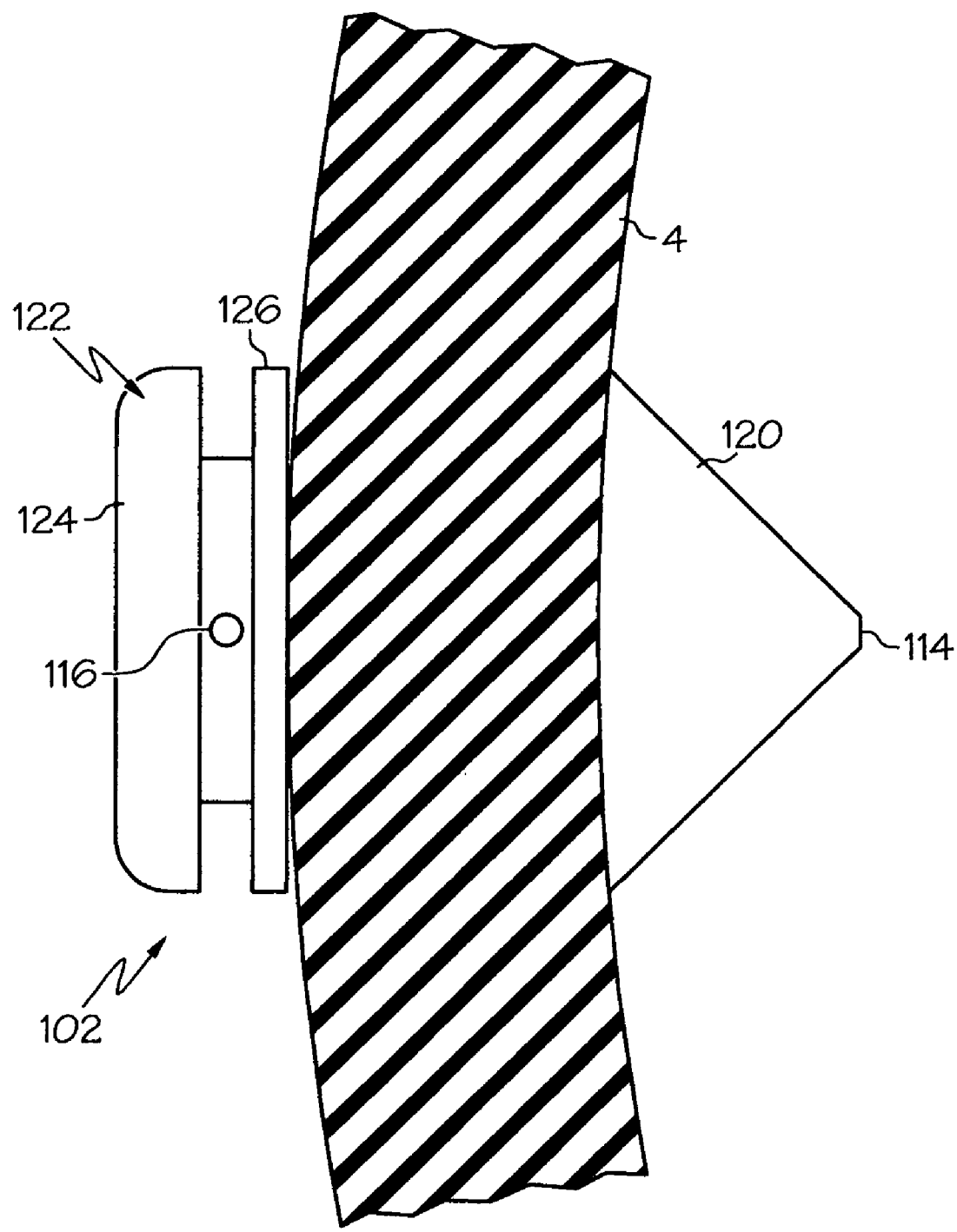
FIG. 11 is a section view taken along line 11-11 of FIG. 10.

A further alternative embodiment of the vent plug is indicated generally by the numeral 102 in FIGS. 10 and 11. Vent plug 102 allows air to be drawn into short milk tube 4 of milking liner 6 when barrel 8 of liner 6 is moving from the collapsed configuration toward the uncollapsed configuration to prevent milk from being drawn back towards barrel 8.

The air being drawn into short milk tube 4 through vent plug 102 is indicated by the numeral 110. Vent plug 102 defines a vent passage 112 that extends entirely through vent plug 102 such that the passageway defined by short milk tube 4 is in fluid communication with the atmosphere surrounding the outer surface of short milk tube 4. Vent passage 112 includes an outlet 114 adapted to be disposed inside liner 6 and at least one inlet 116 adapted to be positioned outside liner 6. Inlet 116 is protected from debris that may be splashed or splattered against the outer surface of vent plug 102. This inlet 116 configuration requires air 10 to turn through a 90 degree curve before passing through vent plug 102. Inlet 116 is thus disposed between at least a portion of the body of vent plug 102 and a portion of short milk tube 4 or between a portion of the body and outlet 114.

Figure 12:
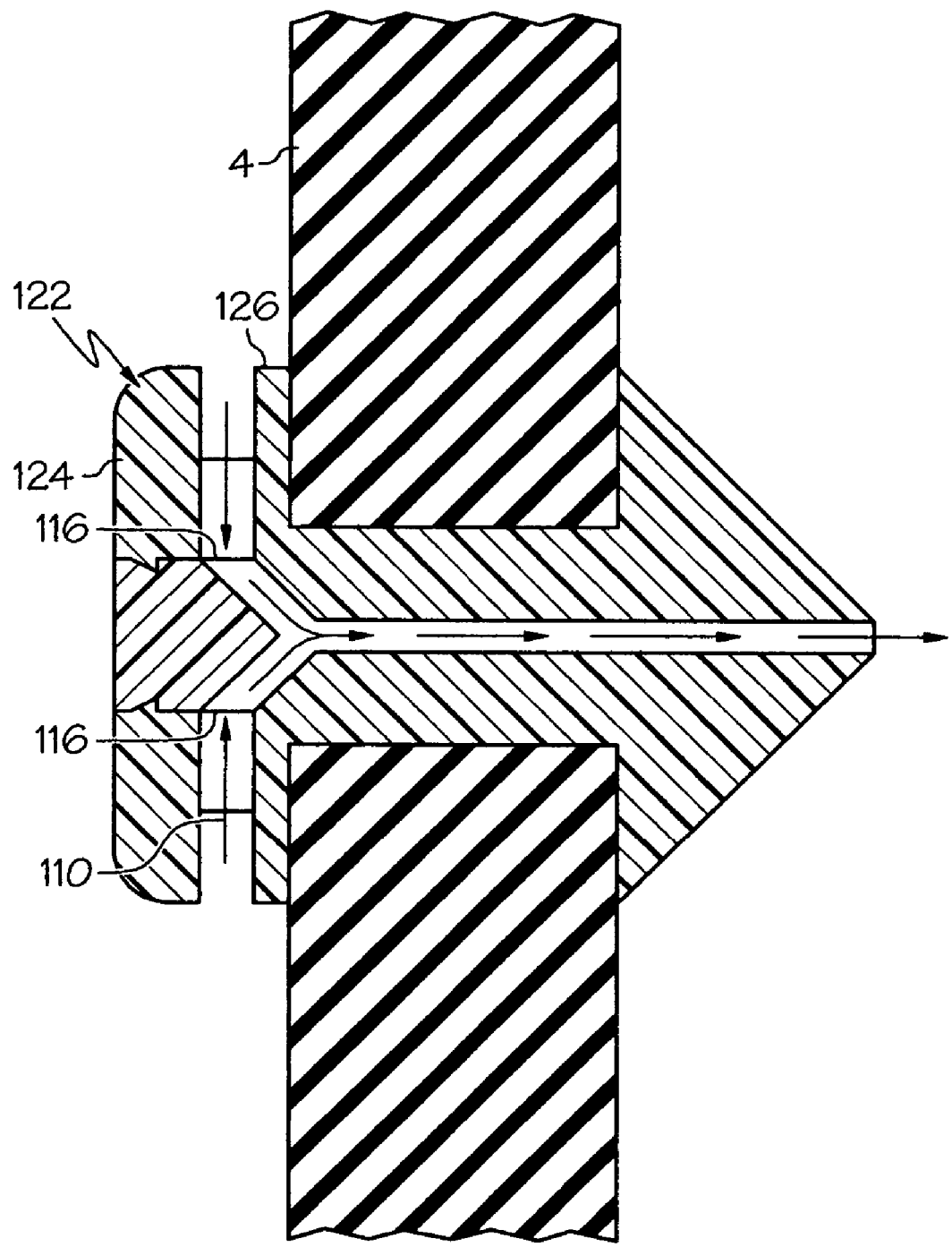
FIG. 12 is a view similar to FIG. 10 showing an alternative inlet configuration.

In the exemplary embodiments of the invention, inlet 116 may be provided in the form of a plurality of inlet holes 116. Although only two inlet holes are depicted in the exemplary drawings, an array of inlet holes 116 may be used to allow air to be drawn into vent passage 112. The use of more than one inlet hole 116 also makes vent plug 102 less likely to clog. Various inlet configurations are contemplated including a single inlet 116 sized the same, smaller than, or larger than outlet 114 or a plurality of inlets 116. Inlet holes 116 may each having a longitudinal axis normal to the surface of vent lug 102 where inlet 116 exits the body of vent plug 102 or may be tilted at an angle as shown in FIG. 12. The configuration of inlet 116, the use of multiple inlets 116, and the location of inlets 116 make vent plug 2 difficult to clog.

The body of vent plug 102 generally includes a body tube 118, an inner flange 120, and an outer flange 122. Inner flange 120 is pointed or in the form of a cone or a pyramid so that it may be forced through the opening defined by short milk tube 4 in order to install vent plug 102. Inner flange 120 may have a configuration similar to inner flange 20 described above, although it has been that it is desirable to size inner flange 120 to have an outer dimension 121 that is greater than twice the thickness 123 of body tube 118 so that vent plug 102 is not easy to remove from short milk tube 4 after it is installed.

In one configuration, inlet 116 may be disposed directly in body tube 118 between the wall of short milk tube 4 and outer flange 122. In the exemplary embodiment, outer flange 122 includes an outer wall 124 and a spacer 126. Wall 124 and spacer 126 may have the same outer dimensions but spacer 126 may be smaller in some configurations. Spacer 126 engages the outer body wall of short milk tube 4, helps to secure vent plug 102 in short milk tube 4, and prevents inlets 116 from being obstructed by short milk tube 4. Outer wall 124 shields inlet 116. A portion of outer wall 124 is disposed in a position that locates at least a portion of inlet between outer wall 124 and short milk tube 4.

Outer wall 124 also defines an opening and a tooth 130 that extends into the opening. A cap 132 is snap fit into opening. This configuration allows vent plug 102 to be fabricated and reliably assembled.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A vent plug for a milking liner; the vent plug comprising:
   a vent plug body defining a vent passage;
   the vent passage having an outlet adapted to be disposed inside the milking liner when the vent plug is installed in the milking liner;
   the vent passage having at least two inlets adapted to be disposed outside the milking liner when the vent plug is installed in the milking liner; and
   the at least two inlets being being shielded by at least a portion of the vent plug body.

2. The vent plug of claim 1, wherein the vent plug body includes a spacer adapted to be disposed between the milking liner and the inlet.

3. The vent plug of claim 2, wherein the vent plug body includes an outer wall; the inlets being disposed between the outer wall and the spacer.

4. The vent plug of claim 1, wherein the inlets and vent passage are configured to turn the airflow entering the vent plug 90 degrees.

5. The vent plug of claim 1, wherein the vent plug body includes an inner flange having an outer dimension and a body tube having a thickness; the outer dimension of the inner flange being at least twice the thickness of the body tube.

6. A vent plug for a milking liner; the vent plug comprising:
   a vent plug body defining a vent passage;
   the vent passage having an outlet adapted to be disposed inside the milking liner when the vent plug is installed in the milking liner;
   the vent passage having at least one inlet adapted to be disposed outside the milking liner when the vent plug is installed in the milking liner;
   the vent plug body including an inner flange having an outer dimension and a body tube having a thickness; the outer dimension of the inner flange being at least twice the thickness of the body tube;
   the vent plug body including an outer flange having an outer wall and a spacer; the at least one inlet being disposed between the outer wall and the spacer; and
   a cap snap fit to the outer wall.

7. The vent plug of claim 6, wherein the at least one inlet and vent passage are configured to turn the airflow entering the vent plug 90 degrees.

8. A vent plug for a milking liner; the vent plug comprising:
   a vent plug body defining a vent passage; the vent plug body having an outer wall;
   the vent passage having an outlet adapted to be disposed inside the milking liner when the vent plug is installed in the milking liner;
   the vent passage having at least one inlet adapted to be disposed outside the milking liner when the vent plug is installed in the milking liner;
   the vent plug body having a body tube and an outer flange; a portion of the tube adapted to be disposed in the wall of the milking liner; the outer flange adapted to be positioned outside the milking liner;
   a cap snap fit to the outer wall; and the at least one inlet being defined by a portion of the body tube.

9. The vent plug of claim 8, further comprising a spacer adapted to be disposed between the milking liner and the at least one inlet.

10. The vent plug of claim 8, wherein the at least one inlet and vent passage are configured to turn the airflow entering the vent plug 90 degrees.

11. A vent plug for a milking liner having a milk tube; the vent plug comprising:
   a vent plug body defining a vent passage; the vent plug body being adapted to be carried by the milk tube of the milking liner to vent the milk tube of the milking liner;
   the vent passage having an outlet adapted to be disposed inside the milk tube when the vent plug is installed in the milking liner;
   the vent passage having at least one inlet adapted to be disposed outside the milk tube when the vent plug is installed in the milking liner; the at least one inlet being open to the air surrounding the vent plug body and milk tube to allow air to be drawn through the vent passage into the milk tube;
   the vent plug body having a spacer adapted to be disposed between the milk tube and the at least one inlet;
   the vent plug body having an outer wall;
   the spacer and the outer wall defining a groove having a bottom; the groove being defined directly between an outer surface of the spacer and an inner surface of the outer wall; the inlet disposed at the bottom of the groove;
   the at least one inlet being open to the air surrounding the spacer and outer wall; and
   the at least one inlet being shielded by the outer wall.

12. The vent plug of claim 11, wherein the vent plug body includes at least two inlets disposed between the outer wall and the spacer such that the inlets are shielded by the outer wall.

13. The vent plug of claim 12, wherein the inlets are disposed on opposite sides of the vent plug body.

14. The vent plug of claim 12, wherein the spacer and outer wall define a pair of grooves having bottoms; the inlets disposed at the bottoms of the grooves.

15. The vent plug of claim 11, wherein the at least one inlet and vent passage are configured to turn the airflow entering the vent plug 90 degrees.

16. The vent plug of claim 14, wherein the vent plug body includes an inner flange having an outer dimension and a body tube having a thickness; the outer dimension of the inner flange being at least twice the thickness of the body tube.

* * * * *